*(12)* United States Patent
Lakshmanan et al.

(10) Patent No.: US 7,803,336 B2
(45) Date of Patent: Sep. 28, 2010

US007803336B2

(54) PROCESS FOR THE RECOVERY OF TITANIUM IN MIXED CHLORIDE MEDIA

(75) Inventors: Vaikuntum I. Lakshmanan, Mississauga (CA); Ramamritham Sridhar, Mississauga (CA); G. Bryn Harris, Montreal (CA); George Puvvada, Markham (CA)

(73) Assignee: Process Research Ortech, Inc., Ontario (CA)

( * ) Notice: Subject to any disclaimer, the term of this patent is extended or adjusted under 35 U.S.C. 154(b) by 1034 days.

(21) Appl. No.: 10/981,143

(22) Filed: Nov. 4, 2004

(65) Prior Publication Data

US 2005/0142051 A1    Jun. 30, 2005

Related U.S. Application Data

(60) Provisional application No. 60/523,090, filed on Nov. 19, 2003.

(51) Int. Cl.
*C01G 23/02* (2006.01)
*C01G 23/047* (2006.01)
*C01G 23/07* (2006.01)

(52) U.S. Cl. .............................. 423/73; 423/82; 423/84; 423/85

(58) Field of Classification Search ................... 423/82, 423/83, 84, 85, 86, 87, 88, 73
See application file for complete search history.

(56) References Cited

U.S. PATENT DOCUMENTS

| | | | |
|---|---|---|---|
| 1,325,561 A | 12/1919 | Farup | |
| 2,406,577 A | 8/1946 | Alessandroni et al. | |
| 3,104,950 A | 9/1963 | Ellis | |
| 3,787,139 A | 1/1974 | Oster | |
| 3,903,239 A | 9/1975 | Berkovich | |
| 3,922,164 A | 11/1975 | Reid et al. | |
| 4,202,863 A | 5/1980 | Tolley | 423/82 |
| 4,536,214 A | 8/1985 | Ochs et al. | 75/724 |
| 5,232,490 A | 8/1993 | Bender et al. | 75/733 |
| 6,375,923 B1 | 4/2002 | Duyvesteyn et al. | |
| 6,500,396 B1 | 12/2002 | Lakshmanan et al. | |
| 6,699,446 B2 | 3/2004 | Lakshmanan et al. | |
| 2001/0007646 A1 | 7/2001 | Lakshmanan et al. | 423/139 |

FOREIGN PATENT DOCUMENTS

| | | |
|---|---|---|
| CA | 844536 | 6/1970 |
| CA | 2363031 | 8/2000 |
| EP | 1281779 | 2/2003 |
| GB | 409847 | 5/1934 |
| WO | WO 96/02455 | 8/1996 |
| ZA | 9200939 | 8/1993 |

OTHER PUBLICATIONS

International Search Report dated Jan. 28, 2005.

*Primary Examiner*—Stanley Silverman
*Assistant Examiner*—James Fiorito
(74) *Attorney, Agent, or Firm*—Ohlandt, Greeley, Ruggiero & Perle, LLP (57) ABSTRACT

A process for leaching a value metal from a titanium-bearing ore material comprising the step of leaching the ore material at atmospheric pressure with a lixiviant comprising a chloride and hydrochloric acid is disclosed. The leaching conditions are such that titanium is leached and remains in solution. The temperature is maintained at less that 85° C., and the concentration of hydrochloric acid is preferably less than 20% (mass ratio). The preferred chloride is magnesium chloride. The lixiviant may contain oxidant e.g. sodium chlorate or chlorine.

17 Claims, 1 Drawing Sheet

Fig. 1

PROCESS FOR THE RECOVERY OF TITANIUM IN MIXED CHLORIDE MEDIA

REFERENCE TO RELATED APPLICATION

This application claims priority under 35 USC 119(e) from U.S. Provisional Application No. 60/523,090 filed Nov. 19, 2003.

BACKGROUND OF THE INVENTION

The present invention relates to a method for the leaching and recovery of value metals, especially titanium in the form of titanium metal or titanium dioxide, from titanium-bearing ore material, especially ores or concentrates e.g. ilmenite ores or concentrates. In particular, the present invention relates to a process for the leaching of titanium-bearing ores with a lixiviant of hydrochloric acid and chloride, especially magnesium chloride, under conditions such that both iron and titanium in the ore are leached into solution. Temperature is controlled so that titanium values remain in solution. Iron may then be selectively extracted from the solution, to provide a solution of titanium values, from which titanium may be recovered. The process operates at atmospheric pressure. Pre-treatment of the ore e.g. oxidation and/or reduction of the ore, is not required. Oxidant may be added to the lixiviant. The process operates with a relatively low concentration of hydrochloric acid, especially with the concentration of hydrochloric acid being less than 20% (mass ratio). Preferably, the chloride is magnesium chloride, and hydrochloric acid and magnesium chloride are regenerated and recycled in the process. The process may be described as a direct process for leaching and recovery of titanium, as pre-treatment of the ore is not required and the leaching step produces a solution of titanium values. The process is believed to be friendly to the environment, without extensive treatment procedures.

DESCRIPTION OF THE PRIOR ART

Processes for the recovery of titanium dioxide from ores are known. The majority of these processes involve digestion of the ore in a mineral acid, such as hydrochloric acid or sulphuric acid, to remove at least the titanium values from the ore. In many such processes, the purity of the titanium dioxide obtained may be about 90-95%, and hence further purification procedures are required to produce a high quality pigment grade product. The further purification procedures add considerably to the cost, and many of the procedures involve techniques that are environmentally unacceptable without extensive procedures to treat various gases, solutions and solids obtained.

Ilmenite is a titanium-bearing ore of the general formula $TiO_2.FeO$ with varying amounts of $Fe_2O_3$ and gangue materials, usually silicates, alumina, lime and magnesia. In addition to titanium, ilmenite typically contains other value metals e.g. one or more of vanadium, chromium, copper, manganese, molybdenum, lead, nickel, zinc, zirconium, niobium and tantalum. Ilmenite ore may be leached as such or beneficiated to produce a concentrate, beneficiation being employed if the ore is low in titanium content. Processes for the recovery of titanium dioxide from ilmenite in high purity and yield are known.

A process for the extraction of iron from iron-containing titaniferous ores is described in U.S. Pat. No. 2,406,577 of Alessandroni et al, with an objective of obtaining a titanium-bearing concentrate from iron-containing titaniferous ores. This is accomplished by selective extraction of iron from the ore. The temperature is maintained above 70° C. so that any titanium that may be dissolved is re-precipitated. Improved selective extraction of iron at the higher temperatures, temperatures of about 110° C. being illustrated, is obtained when chloride salts are added to hydrochloric acid. Alessandroni et al disclose the selective leaching of iron values from titaniferous ore with a solution of hydrochloric acid of a specific gravity of approximately 1.10 and at least 0.5 mol of a soluble chloride e.g. alkali metal chlorides, alkaline earth metal chlorides and aluminum chloride, and exemplify temperatures in excess of 108° C. Heating of the mixture of ore and lixiviant until there is substantial dissolution of iron contained in the ore is disclosed.

A process for leaching ilmenite is described in U.S. Pat. No. 3,903,239 of S. A. Berkovich. The process comprising contacting ilmenite, or a concentrate thereof, with concentrated hydrochloric acid lixiviant solution at a temperature of about 15-30° C. to solubilize and leach from the ore at least 80% and preferably at least 95% of the iron and titanium values. The leaching time is typically 3-25 days, using counter-current flow or the use of closed cycle loops in which hydrochloric acid is continuously passed through a bed of the ore. The reaction is exothermic, and cooling of the reactants may be required. Subsequent to leaching, ferric ion in the lixiviant solution is converted to ferrous ion e.g. using a gaseous reductant such as sulphur dioxide, after which the solution is subjected to hydrolysis. The ore may be pre-treated prior to contact with the concentrated hydrochloric acid to increase the rate of dissolution of titanium and iron values during leaching. The pre-treatment is a smelting step that may include oxidation at elevated temperature e.g. 600-1000° C., in the presence of air or oxygen, followed by a reduction of at least part of the iron oxide in the ore with carbon or carbon monoxide.

"Upgrading of Titania Slags by Selective Chlorination of Molten Salts" by L. Freitas and M. Gueguin, pages 449-461, Chloride Metallurgy 2002 Volume II 32$^{nd}$ Annual Hydrometallurgy Meeting, Edited by E. Peek and G. Van Weert, published by CIM, describes selective chlorination of slag from electro-smelting of hard rock ilmenites, in a molten salt bath followed by separation of the chlorinated slag from the salt bath and leaching with water. Impurities in the slag are converted into chlorides that volatilize or remain in the molten salt.

U.S. Pat. No. 3,922,164 of Reid et al describes removal of iron from ilmenite in an ilmenite up-grading process. Ilmenite is leached with a hydrochloric acid solution containing at least 10% by weight of hydrochloric acid and at least 5% by weight of a soluble salt, suitable salts including ferrous chloride, manganese chloride, magnesium chloride, nickel chloride, calcium chloride and ammonium chloride The introduction of the additional chloride changes the boiling characteristics of the leach liquor so that higher temperatures can be employed, temperatures between 100° C. and 112° C. being preferred but temperatures of up to 115° C. being possible in some systems. Leaching of oxidized/de-oxidized ore with $HCl/MgCl_2$ solution under reflux conditions is exemplified and the extraction of iron shown graphically.

U.S. Pat. No. 6,375,923 of Duyvesteyn et al and "The Altair $TiO_2$ Pigment Process and its Extension into the Field of Nanomaterials" by D. Verhulst, B Sabacky, T. Spitler and W. Duyvesteyn, pages 417-432, Chloride Metallurgy 2002 Volume II 32$^{nd}$ Annual Hydrometallurgy Meeting, Edited by E. Peek and G. Van Weert, published by CIM, describe a hydrometallurgical process for producing pigment-grade titanium dioxide from a titaniferous ore. The process comprises leaching the ore with a solution of hydrochloric acid or recycled hydrochloric acid/iron chloride solution at a temperature of at least 50° C. to provide a leachate of titanium chloride, ferrous chloride, ferric chloride and impurity chlorides, a residue of undissolved solids and sufficient excess hydrochloric acid to prevent precipitation of titanium dioxide. The lixiviant used has a high chloride content, especially >400 g/L, and the vapour pressure of the solution is greater than atmospheric. Gaseous hydrogen chloride may be injected into the leaching solution. The leachate is separated from solids and the ferric ions in the leachate are reduced to ferrous ions. The solution is then cooled to crystallize ferrous chloride. The resultant solution containing titanium ions, ferric ions and ferrous ions is contacted with a water-immiscible organophosphorus extractant. The pregnant strip solution containing titanium and ferric ions, and a minor amount of ferrous ions, is contacted with an amine extractant. The raffinate obtained, which contains titanium ions, is hydrolyzed to produce titanium dioxide. HCl solutions from pyrohydrolysis and from $TiO_2$ hydrolysis are combined and converted into HCl gas and water by pressure-swing distillation.

U.S. Pat. Nos. 6,500,396 and 6,699,446 of V. I. Lakshmanan et al describe methods for the production of titanium metal and titanium tetrachloride from titanium-bearing ore, titanium dioxide being produced from the titanium tetrachloride. In embodiments, ore or concentrate is leached with an aqueous solution of a hydrogen halide, especially hydrochloric acid, at a temperature of at least 90° C., followed by a solids/liquids separation and extraction with an immiscible organic phase. In other embodiments, the ore is leached with the hydrogen halide in the presence of an oxidizing agent. A variety of oxidizing agents are disclosed, including air, hydrogen or other peroxides, or sodium or other perchlorates. In the leach solution, iron is solubilized and titanium is converted into titanium dioxide. Use of concentrated hydrochloric acid (11N) is illustrated.

U.S. Pat. No. 3,104,950 of D. A. Ellis describes leaching of titaniferous ore using concentrated hydrochloric acid, and separation of iron and titanium values using solvent extraction. The effective concentration of hydrochloric acid is stated to be between about 6 and about 12 molar. The temperature may be from about 50° C. to about 80° C.

In the light of the above, alternative methods that provide cost-efficient extraction of titanium from titanium-bearing ores or concentrates are required.

SUMMARY OF THE INVENTION

It is an object of an aspect of this invention to provide a process for leaching titanium and other value metals from titanium-bearing ore material, especially ore or concentrate. It is an object of a further aspect of the present invention to provide such a process that operates at atmospheric pressure, and in which in the leaching step titanium is leached into solution. In particular, in the leaching step titanium and iron values are leached into solution.

Accordingly, the present invention provides a process for leaching of titanium from a titanium-bearing ore material selected from the group consisting of a titanium-bearing ore, concentrate thereof, modified ore thereof and tailings thereof, and mixtures thereof, said process comprising the step of leaching the titanium-bearing ore material at atmospheric pressure with a lixiviant comprising hydrochloric acid and a chloride selected from the group consisting of alkali metal chlorides, magnesium chloride and calcium chloride, and mixtures thereof, the leach being carried out at a temperature such that titanium leached from the titanium-bearing ore material remains in solution.

In a preferred embodiment of the invention, the titanium-bearing ore material is a titaniferous ore, concentrate thereof, modified ore thereof and tailings thereof, and mixtures thereof, and titanium and iron values are leached from the titanium-bearing ore material.

In further embodiments, the temperature is less than 85° C., especially less than 80° C. and in particular is in the range of 65-80° C.

In particularly preferred embodiments, the chloride is magnesium chloride and the hydrochloric acid is at a concentration of less than 20% (mass ratio).

In further embodiments, the titanium-bearing ore material contains titanium and at least one value metal selected from the group consisting of vanadium, chromium, manganese, molybdenum, lead, zirconium, niobium and tantalum.

In an additional embodiment, the redox potential (Eh) of the leach solution is at least 350 mV.

In other embodiments, the concentration of magnesium chloride is at least 100 g/L, especially with the total concentration of chloride ion in the range of 100-500 g/L. Preferably, the total concentration of chloride ions is in the range of 100-400 g/L, said total concentration being formed from magnesium chloride and hydrochloric acid. Additionally, the amount of hydrochloric acid is preferably in the range of 30-200 g/L.

In a further embodiment, the lixiviant comprises hydrochloric acid at a concentration of less than 20% (mass ratio), a chloride selected from the group consisting of alkali metal chlorides, magnesium chloride and calcium chloride, and mixtures thereof, and an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof. Preferably, the chloride is magnesium chloride and the oxidant is selected from the group consisting of chlorine, sodium chlorate, sodium perchlorate, hydrogen peroxide and perchloric acid, and especially is perchloric acid.

In embodiments, solution obtained from leaching of the titanium-bearing ore material is subjected to a liquid/solid separation step, thereby obtaining a solids fraction and a liquid fraction, and the liquid fraction so obtained is subjected to steps to steps to recover value metals therefrom. Preferably, the liquid fraction so obtained is subjected to solvent extraction step for removal of iron compounds, thereby providing a second liquid fraction. In embodiments, the second liquid fraction is subjected to a step for removal of any vanadium and chromium in said second liquid fraction, thereby providing a third liquid fraction containing titanium chloride compound. Preferably, the titanium chloride compound in the third liquid fraction is converted into titanium dioxide by a step selected from (i) solvent extraction of the third liquid fraction and subsequent formation of titanium dioxide from said solvent extraction, (ii) by precipitation of titanium dioxide by addition water or a base, especially magnesium oxide, or (iii) by raising the temperature of the third liquid fraction to 85-110° C.

In preferred embodiments, lixiviant solution is regenerated. Preferably, one or more of said liquid fractions, or solutions derived therefrom, are treated for regeneration of hydrochloric acid, magnesium chloride and magnesium oxide.

The preferred titanium-bearing ore material is ilmenite.

In a particularly preferred embodiment, the present invention provides a process for leaching titanium from a titanium-bearing ore material, said titanium-bearing ore material being selected from the group consisting of a titanium-bearing ore, concentrate thereof, modified ore thereof and tailings thereof, and mixtures thereof, comprising the steps of:

a) leaching the titanium-bearing ore material at atmospheric pressure with a lixiviant comprising hydrochloric acid and magnesium chloride, the leach being carried out at a temperature such that titanium leached from the titanium-bearing ore material remains in solution;

b) subjecting the solution obtained in step a) to a liquid/solid separation step, thereby obtaining a solids fraction and a liquid fraction; and c) subjecting the liquid fraction obtained in step b) to steps to recover value metals therefrom. Preferably, the hydrochloric acid is at a concentration of less than 20% (mass ratio) and the temperature is less than 80° C.

In preferred embodiments, the titanium-bearing ore material is a titaniferous ore, concentrate thereof, modified ore thereof and tailings thereof, and mixtures thereof, the temperature is in the range of 65-80° C. and titanium and iron values are leached from the titanium-bearing ore material. Preferably, the redox potential (Eh) of the leach solution is at least 350 mV, the concentration of magnesium chloride is at least 100 g/L and the total concentration of chloride ion is in the range of 100-500 g/L. In addition, it is preferred that the total concentration of chloride ions is in the range of 100-400 g/L, said total concentration being formed from magnesium chloride and hydrochloric acid, and the amount of hydrochloric acid is in the range of 30-200 g/L.

In preferred embodiments, in step c), the liquid fraction obtained in step b) is subjected to a solvent extraction step for removal of iron compounds, thereby providing a second liquid fraction. Preferably, the second liquid fraction obtained is subjected to a step for removal of any vanadium and chromium in said second liquid fraction, thereby providing a third liquid fraction containing titanium chloride compound. Furthermore, it is preferred that the titanium chloride compound in the third liquid fraction is converted into titanium dioxide by a step selected from (i) solvent extraction of the third liquid fraction and subsequent formation of titanium dioxide from said solvent extraction, (ii) by precipitation of titanium dioxide by addition water or a base, especially magnesium oxide, or (iii) by raising the temperature of the third liquid fraction to 85-110° C.

In embodiments, the lixiviant comprises hydrochloric acid at a concentration of less than 20% (mass ratio) and magnesium chloride, and an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide and other non-sulphur containing oxidants, and mixtures thereof.

In preferred embodiments, lixiviant solution is regenerated from liquid fractions or solutions obtained in one or more steps therein, or from solutions derived therefrom. In addition, preferably, liquid fractions or solutions obtained in one or more steps therein, or solutions derived therefrom, are treated for regeneration of hydrochloric acid, magnesium chloride and magnesium oxide.

BRIEF DESCRIPTION OF THE DRAWINGS

The present invention will be described with reference to the embodiments of the invention shown in the drawing, in which: The sole FIGURE of drawings shows a flowsheet of an embodiment of a method for the recovery of value metals from titanium-bearing ore material.

DETAILED DESCRIPTION OF THE INVENTION

The present invention relates to a process for leaching of a value metal from a titanium-bearing ore material. In particularly preferred embodiments, the present invention is directed to the recovery of titanium in the form of titanium metal or titanium dioxide from titanium-bearing ores, especially ilmenite.

In its most preferred and comprehensive embodiments, the present invention relates to leaching of ilmenite with a lixiviant of hydrochloric acid and magnesium chloride under conditions such that both titanium and iron values are leached into solution. Using sequential extraction procedures, especially solvent extraction procedures, iron values and other metal values are separated from the leach solution so as to provide a purified solution of titanium chloride. This solution is treated for recovery of titanium dioxide or other form of titanium. Lixiviant solution is regenerated, and hydrochloric acid, magnesium chloride and magnesium oxide used in the process are recovered and recycled.

The present invention particularly relates to processes operated at atmospheric pressure for leaching titanium-bearing ores. Such ores contain titanium and may additionally contain other value metals, especially of at least one of vanadium, chromium, manganese, molybdenum, lead, zirconium, niobium and tantalum. It is understood that titanium is the principal value metal in the ores, and the present invention is directed to the extraction of titanium. The value metal content of the ore may vary widely in type and amount, depending on the source of the ore. The process is operated at atmospheric pressure. While the concentration of hydrochloric acid may be varied, the preferred concentration of hydrochloric acid is not more than about 20% (mass ratio). Such a concentration of acid may be obtained by azeotropic distillation of hydrochloric acid solution, for example in recycle of hydrochloric acid solution in the process e.g. using pyrohydrolysis. As discussed herein, such a low concentration of hydrochloric acid provides advantages to the process, including in recycle steps in the process and in requirements for disposal of effluent.

The titanium-bearing ore material may be ore per se, but is preferably a concentrate thereof. Techniques for treating ilmenite ore, to form a concentrate or for beneficiation of the ore, are known, including the use of gravity or magnetic separation steps. The process is preferably operated with a concentrate of the ore. In other embodiments, the ore may have been subjected to a smelting step in the presence of carbon and/or fluxing agents, after which a slag is separated from the smelting process and subjected to the leaching step. Thus, the ore could be in the form of a matte, e.g. converter matte or liquid furnace matte. The ore could also be in the form of roasted and/or reduced titanium-containing concentrates or other intermediates, all of which including the mattes discussed above being referred to herein as modified ores. The ore may also be in the form of tailings of a titanium-bearing ore. It is understood that the expression "ore" also includes any other form of the ore, and that mixtures of the various forms of the ore may be used. The process of the present invention may be operated without pre-treatment of the titanium-bearing ore. In particular, the process may be operated with or without roasting or reduction of the ore.

In the method of the present invention, ore in a form as discussed above is fed to a leaching step in which the ore is contacted and leached with a lixiviant comprising a chloride and hydrochloric acid, optionally also containing an oxidant. The chloride is selected from the group consisting of alkali metal chlorides, magnesium chloride and calcium chloride, and mixtures thereof. Examples of alkali metal chlorides include sodium chloride and potassium chloride. However, the preferred chloride is magnesium chloride. Other chlorides or mixtures of chlorides may be used in the leaching step, but such other chlorides mixtures may adversely affect steps in separation of value metals and/or in recycle steps to regenerate ingredients of the lixiviant. It is particularly preferred that cations fed to the process be restricted to magnesium i.e. in the form of magnesium chloride or magnesium oxide.

The optional oxidant is selected from the group consisting of alkali metal peroxide, alkali metal perchlorate, ammonium perchlorate, magnesium perchlorate, alkali metal chlorate, magnesium chlorate, alkali metal hypochlorite, chlorine, hydrogen peroxide and other non-sulphur containing oxidants, and mixtures thereof. Examples of alkali metal peroxide are sodium peroxide and potassium peroxide. Examples of alkali metal perchlorates are sodium perchlorate and potassium perchlorate. Ammonium perchlorate, magnesium perchlorate and magnesium chlorate may also be used. Examples of alkali metal chlorates are sodium chlorate and potassium chlorate. An example of an alkali metal hypochlorite is sodium hypochlorite. Other oxidants are non-sulphur containing oxidants; the presence of sulphur in oxidants is to be avoided. The preferred oxidants are chlorine and sodium chlorate.

The leaching step may be conducted continuously as a co-current step, a countercurrent step or in another manner, or the leaching step may be conducted as a batch step. The leaching step is carried out at atmospheric (ambient) pressure i.e. it is not necessary to conduct the leaching step under pressure. The leach is carried out under conditions such that titanium leached from the titanium-bearing ore material is leached into solution and remains in solution i.e. the titanium does not precipitate as, for example titanium dioxide. If the titanium bearing ore material is ilmenite, both titanium and iron are leached into solution. In particular, the leach is carried out at a temperature of less than 85° C., especially at a temperature of less than 80° C. and most preferably at a temperature in the range of 65-80° C. In preferred embodiments, the leaching step is carried out with a chloride concentration of at least 50 g/L and with hydrochloric acid having a maximum concentration of 20% (mass ratio). The upper limit on the chloride concentration may depend on the ions present in the leach solution, especially as a result of leaching of the ore, and resultant formation of complexes. The chloride concentration is most preferably in the range of 100-500 g/L, and especially 150-400 g/L.

In particularly preferred embodiments of the invention, the chloride is derived from magnesium chloride and hydrochloric acid, and the chloride concentration of 100-400 g/L is calculated on the basis of the amounts of magnesium chloride and hydrochloric acid in the lixiviant solution. In particularly preferred embodiments, the amount of hydrochloric acid is in the range of 30-200 g/L and the amount of magnesium chloride is in the range of 80-350 g/L.

The metal chloride/HCl (metal to hydrochloric acid) ratio expressed in terms of mass percentage (m/m) in the leach is preferably adjusted to optimize the leach, based on for example the particular ore being leached and temperature.

The amount of oxidant, if present, relates to the redox potential (Eh) of the leaching solution. The Eh (redox potential versus SHE (standard hydrogen electrode)) is preferably maintained in the range of 150-700 mV, and in preferred embodiments is at least 350 mV. It is believed that increases in Eh tend to increase the amount of titanium that is leached.

As noted above, the leach is carried out at temperatures under titanium remains in solution during the leach. In particular, the leach may be carried out at a temperature of up to about 85° C., especially at less than about 80° C. and preferably at temperatures in the range of about 65-80° C. Under some leaching conditions, precipitation of titanium dioxide may occur at temperatures approaching 85° C. in which event the temperature of the leach should be lowered.

A value metal-rich solution (leachate) is obtained in the leach step. The residue (solids) may be in the form of a suspension. The leach mixture is fed to a solid/liquid separation step to effect separation of leachate from solids e.g. leach residue and other gangue. Techniques for such separation are known e.g. using a pressure or vacuum filter, counter-current decantation or centrifuge.

Figure 1:
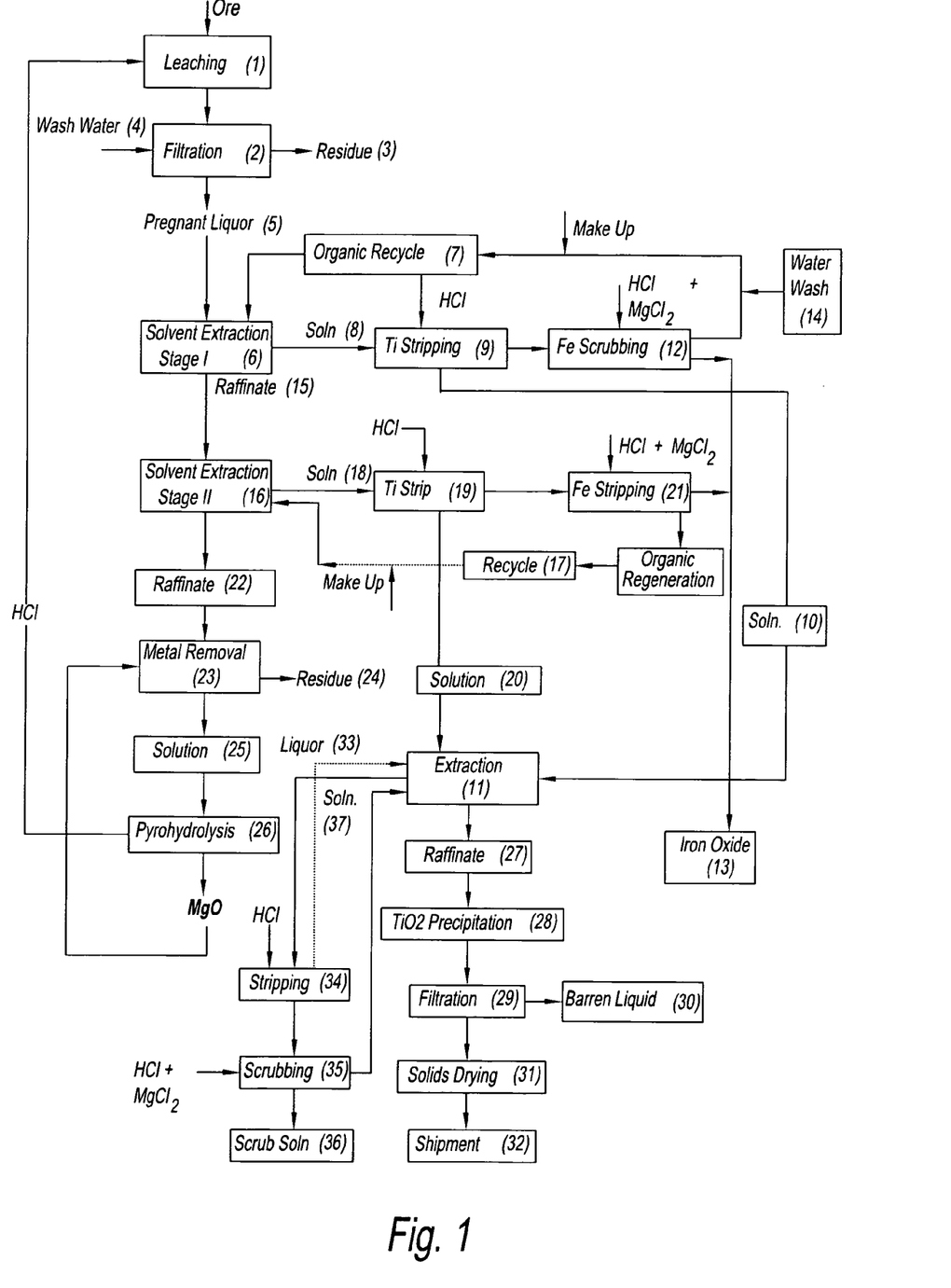

In order to recover value metals, the leachate obtained from the above solids/liquid separation step is subjected to one or more steps to separate value metals. Techniques for the separation and recovery of value metals from the leachate will be apparent to persons skilled in the art. For instance, value metals especially titanium in the form of the metal per se or as titanium dioxide, may be recovered from the leach solution by standard or other known methods. For example, separation methods e.g. ion exchange, solvent extraction or precipitation, may be used to remove impurities e.g. iron, chromium and vanadium, followed by recovery of titanium as, in particular titanium metal or especially titanium dioxide, using e.g. precipitation. Some of these techniques are discussed in the aforementioned U.S. Pat. No. 6,500,396. Solvent extraction procedures are preferred. One example of a separation procedure using solvent extraction is illustrated in the sole FIGURE of drawings, and steps shown are discussed below.

The titanium values in the leachate will be in the form of a titanium chloride compound, which may include titanium oxychloride. As discussed in the aforementioned U.S. Pat. No. 6,500,396, the leachate may be treated with an organic phase. The organic phase may be selected so that iron values are selectively extracted into the organic phase, with titanium values remaining in the aqueous solution. Preferably, iron values are separated almost to the exclusion of other value metals, or with values that are readily separated therefrom, so that iron oxides may be obtained in high purity. Examples of the organic phase are quaternary ammonium chlorides, amines (primary, secondary or tertiary), phosphoric and phosphinic acids, and esters and oxides thereof, e.g. tri-n-butyl phosphate, di-2-ethylhexyl phosphoric acid and phosphine oxide. The organic phase may be stripped from the iron values and recycled. Preferably, hydrochloric acid is also obtained as a by-product for example by hydrolysis or iron chloride solution and recycled. The method used to remove iron may also remove other impurity metals e.g. chromium and vanadium, or separate steps may be used to remove such other metals.

Subsequent to removal of iron, chromium and vanadium, steps may be taken to obtain titanium from the solution, for example by extraction with an organic phase. Such an organic phase is selected so that the titanium chloride is soluble in the organic phase. Preferably, the organic phase is selected such that the organic phase and titanium chloride may be separated by fractional distillation e.g. with a separation in boiling points between the organic phase and titanium chloride of at least 50° C. and preferably at least 70° C., with either having the lower boiling point. The organic phase must be immiscible with the aqueous phase, so that separation may be effected. Continuous or batch extraction may be used. The organic phase should be selected so that it has a flash point that is acceptable under the operating conditions, and so that is stable with respect to both the aqueous solution and titanium chloride. Iron oxide may be recovered from the aqueous solution, and hydrochloric acid recycled. Examples of the organic phase include crown ethers, phosphine acid oxide, phosphonic acid or esters, or tertiary or quaternary ammonium salt.

Leachate from the solids/liquid separation step may be subjected sequentially to solvent extraction to remove impurities, including iron, and then to strip titanium values. Examples of such methods are discussed herein, especially below with reference to the embodiment shown in the sole FIGURE of drawings, but other methods may be used. The titanium chloride product thus obtained may be treated with water or a base, especially magnesium oxide, or by raising the temperature of the solution to 85-110° C., to effect precipitation of titanium dioxide, with the magnesium chloride obtained being subjected to pyrohydrolysis for recovery and recycle of hydrochloric acid and magnesium oxide. The titanium chloride product obtained may also be subjected to calcination in a pyrohydrolysis reactor e.g. in a Torbed reactor, according to the reaction.

$$TiCl_4 + 2H_2O \Rightarrow TiO_2 + 4HCl$$

$$TiOCl_2 + H_2O \Rightarrow TiO_2 + 2HCl$$

Similarly, the barren magnesium chloride-containing solution may be pyrohydrolyzed according to the reaction $$MgCl_2 + H_2O \Rightarrow MgO + 2HCl$$

with steps being taken if necessary to wash magnesium oxide from the titanium oxide obtained.

In embodiments, essentially all of the iron is dissolved by the hydrochloric acid. The iron chloride obtained e.g. $H^+FeCl_4^-$ or $FeCl_3$, is preferably subjected to hydrolysis to regenerate HCl.

The leachate from the initial solids/liquid separation, which contains titanium values, may also be subjected to a precipitation step, by raising the temperature to 85-110° C. or by using for example water or a base, preferably magnesium oxide. If magnesium oxide is used, the magnesium chloride obtained may be recycled to the leach step, or subjected to steps to recover magnesium oxide and hydrochloric acid.

Other methods may be used to treat the leachate solution obtained above, to separate titanium, iron and other value metals.

A particular embodiment of a method for the leaching of a titanium-bearing ore or concentrate and for the recovery of value metals is shown in the sole FIGURE of drawings. The method shown in the sole FIGURE of drawings is an illustration of the invention, and recovery of products, and the invention is not limited thereto.

In the method as exemplified by the embodiment shown in the sole FIGURE of drawings, ore or concentrate is fed to leaching step 1, which is illustrated as being a batch-leaching step. Leaching may carried out with a lixiviant of 6N hydrochloric acid and 300 g/L of magnesium chloride ($MgCl_2$), the lixiviant being used in a sufficient amount required for the leaching of the titanium in the ore or concentrate, especially such that the amount of hydrochloric acid is greater than the stoichiometric amount e.g. 1.2×, required for the leaching of titanium. In embodiments, the leach may be carried out for 4 hours at a temperature of 70-73° C. The leach solution obtained is shown as being subjected to solids/liquid filtration step 2, in which solids are washed with water 4 in an amount that is, for example, 4× the displacement of the solids. Residue 3 is separated. Residue 3 is gangue and other unleached solid material. Pregnant leach liquor 5, which contains the wash water, is obtained; under the conditions of the embodiment illustrated and based on the leaching of an ore containing for example 10-30 wt % of titanium and for example 15-50 wt % of iron, an example of the composition of the pregnant leach liquor obtained is a liquor containing about 24 g/L of titanium and about 40 g/L of iron.

Pregnant leach liquor 5 is shown as being subjected to a first solvent extraction 6 (solvent extraction stage 1). In the example illustrated, the solvent is 25% by volume of tributyl phosphate (TBP), 35% of EXXAL 10, and 45% of CF 431; EXXAL 10 is isodecanol obtained from Exxon and CF 431 is a kerosene-based solution obtained from Univar Canada. The solvent is obtained as organic recycle stream 7, which is discussed below, with make-up solution being added as required. First solvent extraction 6 provides a loaded organic solution 8, which is shown as being fed to titanium stripping step 9. Titanium stripping step 9 may be carried out in 5 stages, using for example a 20:1 ratio of organic to aqueous solution. The aqueous solution is obtained from e.g. 6N hydrochloric acid, which is added in titanium stripping step 9. A titanium chloride solution 10 is obtained, which is shown as being sent to extraction stage 11, discussed below. Organic solution from titanium stripping step 9 is shown as being sent to iron scrubbing step 12, in which the organic solution is scrubbed in for example a single stage with 1N hydrochloric acid solution containing e.g. 100 g/L of magnesium chloride ($MgCl_2$), at an organic:aqueous ratio of for example 4:1. The aqueous solution containing iron that is obtained is shown as being forwarded to step 13 for the production of pigment-grade iron oxide. Organic solution obtained from iron scrubbing step 12 is shown as being subjected to water wash step 14, which is for example a single stage wash with water in a ratio of e.g. 4:1 organic:aqueous phases. The resultant organic solution is organic recycle stream 7, and is shown as being recycled to first solvent extraction 6, as discussed above.

In the embodiment illustrated and on the basis of the example of pregnant leach liquor above, raffinate 15 from first solvent extraction 6 contains, for example, about 14 g/L of titanium and about 24 g/L of iron. Raffinate 15 is shown as being subjected to second solvent extraction 16 using organic recycle stream 17. Organic recycle stream 17 contains for example 15% of TOPO i.e. trioctyl phosphine oxide, 5% of EXXAL 10 isodecanol and 80% of CF 231 kerosene-based solution with make-up being added as required. Second solvent extraction 16 provides loaded organic solution 18, which is shown as being fed to titanium stripping step 19. Titanium stripping step 19 may be carried out in for example 3 stages, using for example a 4:1 ratio of organic to aqueous solution. The aqueous solution is obtained from for example 1N hydrochloric acid having an Eh of 650 mV, the increased Eh being obtained by addition of oxidant e.g. perchloric acid, added in titanium stripping step 19. A titanium chloride solution 20 is obtained, which may also be sent to extraction stage 11, discussed below. Organic solution from titanium stripping step 19 may be sent to iron scrubbing step 21, in which the organic solution is scrubbed in for example a single stage with e.g. 0.25N hydrochloric acid solution containing 100 g/L of magnesium chloride ($MgCl_2$), in a ratio of organic:aqueous of 5:1. The aqueous solution containing iron that is obtained may also be forwarded to step 13 for the production of pigment-grade iron oxide. The resultant organic solution is organic recycle stream 17.

In the embodiment illustrated on the basis of the above example of pregnant leach liquor, raffinate 22 from second solvent extraction 16 contains a very low amount of titanium but a higher concentration, e.g. about 23 g/L of iron. Thus first and second solvent extractions 6 and 16 have reduced the amount of titanium in the pregnant leach liquor 5 from for example about 24 g/L to a very low amount i.e. effected a high degree of removal of titanium from the pregnant leach liquor. In contrast the amount of iron has been reduced from for example about 40 g/L to about 23 g/L, with almost all of the removal of iron being in first solvent extraction 6. Raffinate 22, which may be referred to a titanium-depleted raffinate, may then be subjected to value metal removal step 23 for removal of vanadium, chromium, manganese and iron. Magnesium oxide is added in value metal removal step 23, and residue 24 containing vanadium, chromium, manganese and iron is obtained. Solution 25 obtained in value metal removal step 23 is thus a magnesium chloride solution, which may be subjected to pyrohydrolysis 26. Pyrohydrolysis 26 provides magnesium oxide, which may be recycled to value metal removal step 23, and hydrochloric acid (or hydrogen chloride), which may be recycled to leaching step 1 or used elsewhere in the process.

Titanium chloride solutions 10 and 20 are shown as being subjected to extraction stage 11 using Cyanex 921 phosphine oxide from Cytec, in for example a four stage extraction using organic:aqueous ratios of e.g. 4:1. Raffinate 27 from extraction stage 11 is shown as being subjected to titanium precipitation stage 28, in which the pH of the solution is adjusted to e.g. 0.25 and the temperature of the solution is raised to e.g. 95-100° C. The solution containing titanium dioxide that is thus obtained may be subjected to filtration 29, which provides barren liquor 30 and solids ($TiO_2$) that may be subjected to drying and calcination step 31 and any further treatment and shipment 32. The organic strip liquor 33 may be subjected to stripping step 34 in which organic strip liquor 33 is stripped in e.g. three stages with for example 1N hydrochloric acid having an Eh of 650 mV, obtained as above, using an organic:aqueous ratio of e.g. 4:1. The resultant organic solution may be subjected to scrubbing step 35 using for example 0.25N hydrochloric acid containing 100 g/L of magnesium chloride in a single stage using e.g. a 4:1 organic:aqueous ratio. The scrubbing step is intended to remove impurities e.g. vanadium, iron and chromium, from the solution. Aqueous scrub solution 36 is obtained, which may be treated for disposal, whereas organic solution 37 may be recycled to extraction stage 11.

In the recovery and recycle of HCl, the solution containing HCl may be subjected to partial or pre-evaporation steps. Off-gases from pyrohydrolysis may be used in pre-evaporation, to enrich the solution in HCl and reduce energy costs. However, the degree of partial or pre-evaporation may be reduced, or even eliminated, by feeding gaseous hydrogen chloride to the solution. The hydrogen chloride may be formed by burning chlorine with hydrogen. In this manner, energy required for evaporation of water is reduced or eliminated, and an azeotrope of hydrochloric acid is obtained. The azeotrope of hydrochloric acid has a content of hydrochloric acid of about 20% (mass ratio). The azeotrope may be recycled to the lixiviant solution, offered for sale or used in another manner.

In the process of the present invention, the metal chloride/HCl ratio e.g. metal/HCl ratio and the amount and type of oxidant in the leach step may be adjusted to reflect any specific requirements or characteristics of the process and ore fed to the process. In some instances, a major portion of the chloride ion in the leach solution may be supplied from for example recycled magnesium chloride.

The leaching process may be conducted continuously in at least one stirred tank reactor. Preferably, at least two reactors are used; three or more reactors may be more optimal. As discussed above, the leaching may also be conducted batch, co-current or countercurrent, in whole or in part.

While not being bound by any theory with respect to the process described herein, an increase has been recognized in the activity of HCl when salts such as $CaCl_2$ and $MgCl_2$ are added to dilute solutions of HCl. The increase in the reactivity of HCl is understood to be a function of chloride ion concentration, especially magnesium chloride. In a chloride medium, magnesium ions have a high hydration number, which is believed to cause substantially increased activity of hydrogen ions in the lixiviant solution in the present invention.

The process of the present invention does not require pretreatment of the titanium-bearing ore prior to the leaching step. The leaching conditions, especially the redox potential (Eh) and chloride concentration, may be controlled thereby providing for control of leaching of value metals, formation of chloride complexes and extraction of iron, as will be apparent to persons versed in the chemistry of extraction of titanium-bearing ores.

A particular advantage of the process of the present invention is that high rates of extraction of value metals are obtained in a leaching step that operates at atmospheric pressure and at relatively low concentrations of hydrochloric acid. It is not necessary to operate the leaching step under pressure. The use of atmospheric pressure results in substantial economic advantages, especially in capital costs. Value metals may be recovered. The use of chloride chemistry offers advantages in operating and capital costs of the process. Leaching agent may be regenerated and recycled, especially using a pyrohydrolysis step with additional hydrochloric acid being formed from chlorine if required. Magnesium chloride is the particularly preferred chloride, as it is more readily recycled to the leaching step. The use of hydrochloric acid permits recovery and recycle of hydrochloric acid to the leaching step, especially with relatively small amounts of make-up hydrochloric acid. In particular, the use of the preferred lixiviant of hydrochloric acid and magnesium chloride permits recycle of hydrochloric acid, magnesium chloride and magnesium oxide in the process. The preferred absence of addition of cations other than magnesium to the process facilitates recycle, minimizing potentially detrimental effects of other cations on recycle. In addition, the use of hydrochloric acid in concentrations of not more than 20% (mass ratio) permits use of azeotropic distillation and without addition of substantial amounts of more concentrated hydrochloric acid. The latter would require use of extensive vacuum distillation techniques. The use of the lower concentrations of hydrochloric acid will tend to result in lower extraction of impurities or gangue from the ore, and thus lower concentrations of impurities in solution. Materials requirements for neutralization and other steps are lowered. In particular, the present invention provides for use of azeotropic hydrochloric acid produced by pyrohydrolysis of recycle solutions without the need for addition of hydrochloric acid and disposal of excess hydrochloric acid, which is an environmental problem.

The present invention is illustrated by the following examples. Unless stated otherwise, the Eh of the leach solutions in the examples below was 450-460 mV.

Example I

Laboratory-scale leaching experiments were carried out using a titanium-bearing ore concentrate obtained from an ilmenite ore. The ore concentrate (Feed I) had the following contents of Ti and Fe: $TiO_2$ 28.5% and Fe 35.8%. In Run 1, one hundred grams of this concentrate were leached with a 792 g of 20% HCl solution, such solution containing 158 g of HCl. The temperature of the solution was 75° C. and the leaching time was 3 hours. All leaches were carried out at atmospheric pressure.

In Run 2, the procedure of Run 1 was repeated, except that one hundred grams of the same concentrate were leached with 765 g of 20% HCl solution, containing 153 g of HCl and 426 g of $MgCl_2.6H_2O$.

The leached solutions were subjected to a liquid/solids separation step. The washed solids obtained were subjected to analysis for the content of Ti and Fe. The extraction of each metal was then calculated.

The results obtained are shown in Table 1. The results are expressed as percentages of titanium and iron in the liquid i.e. extracted into solution, and based on the amount of concentrate fed to the leach solution.

TABLE I

|  | Run 1 | Run 2 |
|---|---|---|
| Redox potential (Eh) | 410 mV | 410 mV |
| Ti extraction (liquid) | 25.9 | 54.7 |
| Fe extraction (liquid) | 37.2 | 63.7 |

The results show that leaching of the sample using a leach solution of hydrochloric acid and magnesium chloride resulted in higher extraction of titanium and iron. The extraction of titanium increased from 25.9% of the titanium in the concentrate to 54.7%, which is more than double (2×) the amount of extracted titanium. The increase in extraction for iron between Run 1 and Run 2 was from 37.2 to 63.7% i.e. more than 1.7×.

This example shows the extraction of both titanium and iron from the concentrate. The titanium and iron in the solution obtained may be separated as discussed above, especially using the solvent extraction procedures discussed above.

Example II

A series of leaching experiments were carried out on an ilmenite ore (Feed II) that contained 22.8 wt % of titanium, 38 wt % of iron, 0.13 wt % of chromium oxide ($Cr_2O_3$), 4.69 wt % of $SiO_2$ and 2.82 of magnesium oxide. The ore had a mesh size of −100. The lixiviant was a solution of hydrochloric acid (6N) and magnesium chloride; the stoichiometric amount of hydrochloric acid and the amount of magnesium chloride added, in g/L, are given in Table 2. All leaches were carried out for 4 hours at atmospheric pressure, at a temperature of 70-73° C. The initial volume of solution was 1 L.

Further experimental details and the results obtained are given in Table 2.

TABLE 2

| Run No. | 1 | 2 | 3 | 4 |
|---|---|---|---|---|
| Solids (Initial) g | 175 | 175 | 145 | 145 |
| Solids (%) | 10.25 | 9.92 | 10.55 | 10.25 |
| HCl Amount* | 1.0 | 1.0 | 1.2 | 1.2 |
| $MgCl_2$ added (g/L) | 200 | 250 | 200 | 250 |
| Total Chloride (g/L) | 362 | 398 | 362 | 398 |
| Solids (Final) g | 56.5 | 42.0 | 42.0 | 25.3 |
| Weight Loss (%) | 67.7 | 76.0 | 71.0 | 82.6 |
| Titanium extraction (%) | 64.7 | 65.8 | 46.0 | 76.5 |
| Iron extraction (%) | 71.7 | 72.4 | 74.4 | 69.3 |
| Run No. | 5 | 6 | 7 | 8 |
| Solids (Initial) g | 145 | 145 | 141 | 125 |
| Solids (%) | 10.08 | 9.92 | 9.00 | 9.23 |
| HCl Amount* | 1.2 | 1.2 | 1.2 | 1.4 |
| $MgCl_2$ added (g/L) | 300 | 320 | 386 | 200 |
| Total Chloride (g/L) | 436 | 450 | 498 | 362 |
| Solids (Final) g | 34.6 | 44.9 | 30.6 | 23.7 |
| Weight Loss (%) | 76.1 | 69.0 | 78.3 | 81.0 |
| Titanium extraction (%) | 79.0 | 57.2 | 42.9 | 53.3 |
| Iron extraction (%) | 70.2 | 64.2 | 48.9 | 77.9 |
| Run No. | 9 | 10 | 11 | 12 |
| Solids (Initial) g | 125 | 125 | 125 | 124 |
| Solids (%) | 9.00 | 8.81 | 8.67 | 8.00 |
| HCl Amount* | 1.4 | 1.4 | 1.4 | 1.4 |
| $MgCl_2$ added (g/L) | 250 | 300 | 320 | 386 |
| Total Chloride (g/L) | 398 | 436 | 450 | 500 |
| Solids (Final) g | 30.6 | 17.3 | 17.4 | 26.2 |
| Weight Loss (%) | 75.5 | 86.2 | 86.1 | 78.9 |
| Titanium extraction (%) | 78.2 | 96.9 | 93.6 | 77.0 |
| Iron extraction (%) | 98.9 | 84.8 | 87.2 | 82.6 |

*HCl Amount = stoichiometric amount on hydrochloric acid, based on the amount of titanium and iron in the sample being leached The results show the extraction of both titanium and iron using a lixiviant of hydrochloric acid and magnesium chloride. A level of extraction of titanium as high as 96.9% was achieved under the experimental conditions used. At stoichiometric concentrations of hydrochloric acid, magnesium chloride appeared to have had minimal effects on extraction of titanium. The effects of magnesium chloride in increasing extraction of titanium were most pronounced at concentrations of hydrochloric acid that were greater (1.2× and 1.4×) than the stoichiometric amount required for extraction of titanium and iron. At the highest concentrations of magnesium chloride that were tested, the level of extraction of titanium and iron decreased; the highest concentrations of magnesium chloride were near to the solubility limits in the solutions used. Thus, the results indicate that there is an optimal range of concentrations of both hydrochloric acid and magnesium chloride for the extraction of titanium and iron from the ore into solution.

Example III

To illustrate effects of concentration of hydrochloric acid and presence of magnesium chloride, a further series of leaching experiments were carried out on the ilmenite ore (Feed III) that contained 22.8 wt % of titanium, 38 wt % of iron, 0.13 wt % of chromium oxide ($Cr_2O_3$), 4.69 wt % of $SiO_2$ and 2.82 of magnesium oxide. The ore had a mesh size of −100 mesh. The lixiviant was a solution of hydrochloric acid and optionally magnesium chloride; the stoichiometric amount of hydrochloric acid and the amount of magnesium chloride added, in g/L, are given in Table 3. All leaches were carried out for 4 hours at atmospheric pressure, at a temperature of 65-70° C. Run 15 is a comparative run at high concentration of hydrochloric acid, in the absence of magnesium chloride.

Further experimental details and the results obtained are given in Table 3.

TABLE 3

| Run No. | 13 | 14 | 15 |
|---|---|---|---|
| Solids (Initial) g | 31.8 | 35.7 | 100 |
| Solids (%) | 3.8 | 5 | 16.6 |
| Solution Volume (mL) | 500 | 500 | 430 |
| HCl Concentration | 5 N | 4 N | 32% |
| HCl Amount* | 0.4 | 0.45 | 1.26 |
| $MgCl_2$ added (g/L) | 193.6 | 193.6 | 0 |

TABLE 3-continued

| Run No. | 13 | 14 | 15 |
|---|---|---|---|
| Total Chloride (g/L) | 464 | 428 | 311 |
| Solids (Final) g | 3.6 | 10.3 | 22.8 |
| Weight Loss (%) | 88.7 | 71.1 | 76.4 |
| Titanium extraction (%) | 73.5 | 39.7 | 81.6 |
| Iron extraction (%) | 78.1 | 62.2 | 81.2 |

*HCl Amount = stoichiometric amount on hydrochloric acid, based on the amount of titanium and iron in the sample being leached The results show that the concentration of hydrochloric acid has an effect on the extraction of titanium. In addition, high extractions of titanium are obtainable at relatively low concentrations of hydrochloric acid, if the lixiviant contains added chloride viz. magnesium chloride. Higher extractions of titanium were obtained with 6N hydrochloric acid in Example II than obtained with the lower concentrations of acid in this example. Run 14 shows the effect of a low stoichiometric amount of hydrochloric acid on extraction of titanium and iron. Run 15 is a comparative run in which magnesium chloride was not added. The level of extraction of titanium and iron is only slightly higher than that achieved at a lower concentration of hydrochloric acid but in the presence of magnesium chloride.

Example IV

In a series of comparative experiments, to illustrate effects of concentration of hydrochloric acid in the absence of magnesium chloride, a series of leaching experiments were carried out on an ilmenite ore (Feed IV) that contained 26.8 wt % of titanium, 35.8 wt % of iron, 0.03 wt % of chromium and 0.12 wt % of vanadium. The ore had a mesh size of −100. The lixiviant was a solution of hydrochloric acid; the lixiviant did not contain magnesium chloride. All leaches were carried out at atmospheric pressure, for 6 hours. The temperature was 70-75° C. in Runs 16, 18 and 19, and 60° C. in Run 17.

Further experimental details and the results obtained are given in Table 4.

TABLE 4

| Run No. | 16 | 17 | 18 | 19 |
|---|---|---|---|---|
| Solids (Initial) g | 27.7 | 50 | 30 | 50 |
| Solids (%) | 5 | 13 | 5 | 21 |
| Solution Volume (mL) | 500 | 308 | 500 | 158 |
| HCl Concentration | 4 N | 6 N | 8 N | 11.6 N |
| HCl Amount* | 2.07 | 1.06 | 3.83 | 1.05 |
| MgCl$_2$ added (g/L) | 0 | 0 | 0 | 0 |
| Total Chloride (g/L) | 142 | 215 | 284 | 416 |
| Solids (Final) g | 7.4 | 13.4 | 8.0 | 13.4 |
| Weight Loss (%) | 31.4 | 37.6 | 50.0 | 59.2 |
| Titanium extraction (%) | 7.0 | 6.3 | 17.5 | 18.5 |
| Iron extraction (%) | 37.4 | 13.2 | 36.7 | 30.9 |

*HCl Amount = stoichiometric amount on hydrochloric acid, based on the amount of titanium and iron in the sample being leached The results show low extraction of titanium from the ilmenite ore in the absence of magnesium chloride, even though concentrations of hydrochloric acid as high as 11.8N and stoichiometric amounts as high as 3.83× were used.

Example V

To illustrate effects of leaching at atmospheric pressure using a lixiviant containing both hydrochloric acid and magnesium chloride, including the effects of varying the concentration of magnesium chloride, a further series of leaching experiments were carried out on the ilmenite ore (Feed IV) of Example IV. As in Example IV, the ore had a mesh size of −100. The lixiviant was a solution of 6N hydrochloric acid containing magnesium chloride, except that in Runs 24 and 25 the magnesium chloride was replaced with sodium chloride and calcium chloride, respectively. All leaches were carried out at atmospheric pressure. In Run 20, the temperature was 70-75° C. and the leaching time was 6 hours. In Runs 21-25, the temperature was 65-70° C. and the leaching time was 4 hours.

Further experimental details and the results obtained are given in Table 5.

TABLE 5

| Run No. | 20 | 21 | 22 |
|---|---|---|---|
| Solids (Initial) g | 33 | 80 | 23 |
| Solids (%) | 10 | 10 | 3.1 |
| Solution Volume (mL) | 250 | 510 | 510 |
| HCl Concentration | 6 N | 6 N | 6 N |
| HCl amount* | 1.30 | 1.08 | 3.74 |
| MgCl$_2$ added (g/L) | 40.5 | 193.6 | 193.6 |
| Total Chloride (g/L) | 332 | 500 | 500 |
| Solids (Final) g | 16.7 | 33.6 | 3.3 |
| Weight Loss (%) | 49.4 | 58.0 | 85.7 |
| Titanium extraction (%) | 9.1 | 41.4 | 93.1 |
| Iron extraction (%) | 34.0 | 43.5 | 64.2 |

| Run No. | 23 | 24 | 25 |
|---|---|---|---|
| Solids (Initial) g | 38 | 36 | 32 |
| Solids (%) | 5 | 5.1 | 8.1 |
| Solution Volume (mL) | 510 | 500 | 500 |
| HCl Concentration | 6 N | 6 N | 6 N |
| HCl amount* | 2.27 | 2.39 | 2.69 |
| MgCl$_2$ added (g/L) | 193.6 | 237(NaCl) | 225(CaCl$_2$) |
| Total Chloride (g/L) | 500 | 500 | 500 |
| Solids (Final) g | 6.3 | 18.9 | 4.9 |
| Weight Loss (%) | 83.4 | 47.5 | 84.7 |
| Titanium extraction (%) | 89.9 | 31.8 | 72.1 |
| Iron extraction (%) | 62.8 | 41.0 | 66.3 |

*HCl Amount = stoichiometric amount on hydrochloric acid, based on the amount of titanium and iron in the sample being leached The results show effects of chloride, especially magnesium chloride, on extraction of titanium from the ilmenite ore. Runs 20-23 show enhanced extraction of titanium, compared with Run 17. The addition of further magnesium chloride (Run 21 cf Run 20) resulted in a substantial increase in extraction of titanium, to 41.4%. Runs 22 and 23, with higher stoichiometric amount of hydrochloric acid further improved extraction, to 93% and 89.9%, respectively. Runs 24 and 25 show the effect of replacing magnesium chloride with sodium or calcium chloride. Both chlorides gave lower extraction, particularly sodium chloride, compared with that obtained using magnesium chloride. Magnesium chloride is also the preferred chloride, for reasons discussed herein.

What we claim is:

1. A process for leaching of titanium from a titanium-bearing ore material selected from the group consisting of a titanium-bearing ore, concentrate thereof, modified ore thereof and tailings thereof, and mixtures thereof, said process comprising the steps of:
   (a) leaching the titanium-bearing ore material at atmospheric pressure with a lixiviant comprising hydrochloric acid and magnesium chloride so as to obtain a titanium-rich leach solution, the lixiviant having a concentration of hydrochloric acid of not more than about 20% (mass ratio), based on the amount of lixiviant and a concentration of magnesium chloride of at least 100 g/L, the leach being carried out at a temperature such that titanium in said titanium-rich solution remains in said solution, said temperature of the leach being less than 85° C.;

(b) subjecting the solution obtained in step (a) to a liquid/solid separation step, thereby obtaining a solids fraction and a liquid fraction;

(c) subjecting the liquid fraction obtained in step (b) to steps to recover a liquid fraction containing titanium chloride compounds therefrom; and (d) subjecting the liquid fraction containing titanium chloride compounds of step (c) to steps to recover titanium dioxide therefrom.

2. The process of claim 1 in which the titanium-bearing ore material is selected from the group consisting of a titaniferous ore, a concentrate thereof, a modified ore thereof, tailings thereof and mixtures thereof, and titanium and iron values are leached from the titanium-bearing ore material.

3. The process of claim 1 in which the temperature is less than 80° C.

4. The process of claim 3 in which the temperature is in the range of 65-80° C.

5. The process of claim 3 in which the titanium-bearing ore material is ilmenite.

6. The process of claim 3 in which the titanium-bearing ore material contains titanium and at least one value metal selected from the group consisting of vanadium, chromium, manganese, molybdenum, lead, zirconium, niobium and tantalum.

7. The process of claim 1 in which the redox potential (Eh) of the leach solution is at least 350 mV.

8. The process of claim 7 in which the total concentration of chloride ion is in the range of 100-500 g/L.

9. The process of claim 7 in which the amount of hydrochloric acid is in the range of 30-200 g/L.

10. The process of claim 4 in which the lixiviant comprises hydrochloric acid, magnesium chloride, and an oxidant selected from the group consisting of alkali metal peroxide, alkali metal perchlorate, ammonium perchlorate, magnesium perchlorate, magnesium chlorate, alkali metal chlorate, chlorine, alkali metal hypochlorite, hydrogen peroxide, perchloric acid and other non-sulphur containing oxidants, and mixtures thereof.

11. The process of claim 1 in which titanium dioxide is formed in step (d) by raising the temperature of the liquid fraction containing titanium chloride compounds to 85-110° C.

12. The process of claim 1 in which precipitation of titanium dioxide in step (d) is obtained by addition of magnesium oxide to the liquid fraction containing titanium chloride compounds.

13. The process of claim 1, in which lixiviant solution is regenerated.

14. The process of claim 1 in which one or more of said liquid fractions, are treated for regeneration of hydrochloric acid, magnesium chloride and magnesium oxide.

15. The process of claim 1 in which the concentration of hydrochloric acid in the lixiviant is the azeotropic concentration.

16. The process of claim 14 in which the hydrochloric acid is regenerated by azeotropic distillation and regenerated hydrochloric acid is recycled to step (a).

17. A process for leaching of titanium from a titanium-bearing ore material selected from the group consisting of a titanium-bearing ore, concentrate thereof, modified ore thereof and tailings thereof, and mixtures thereof, said process comprising the step of leaching the titanium-bearing ore material at atmospheric pressure with a lixiviant comprising hydrochloric acid and magnesium chloride so as to obtain a titanium-rich leach solution, the lixiviant having a concentration of hydrochloric acid of not more than about 20% (mass ratio), based on the amount of lixiviant, the leach being carried out at a temperature such that titanium in said titanium-rich solution remains in said solution, said temperature of the leach being from 70° C. to 85° C.

* * * * *